W. F. HUDSON.
MEANS FOR CONVERTING A PLEASURE VEHICLE CHASSIS INTO A COMMERCIAL TRUCK CHASSIS.
APPLICATION FILED APR. 10, 1916.
1,237,207.
Patented Aug. 14, 1917.
3 SHEETS—SHEET 3.
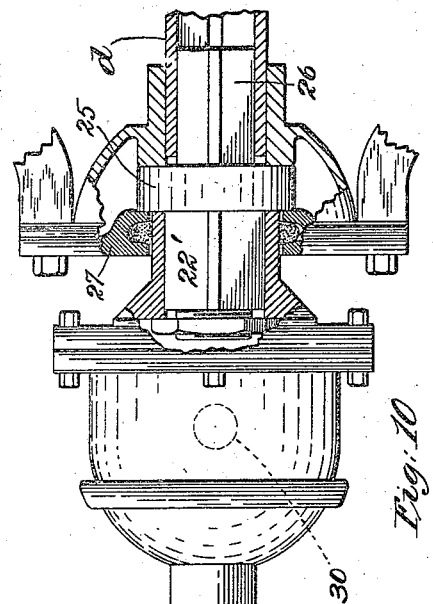
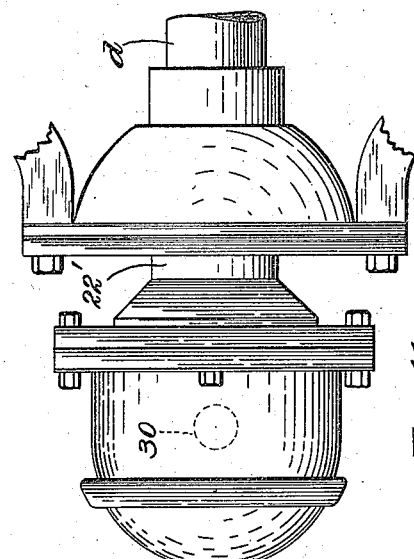
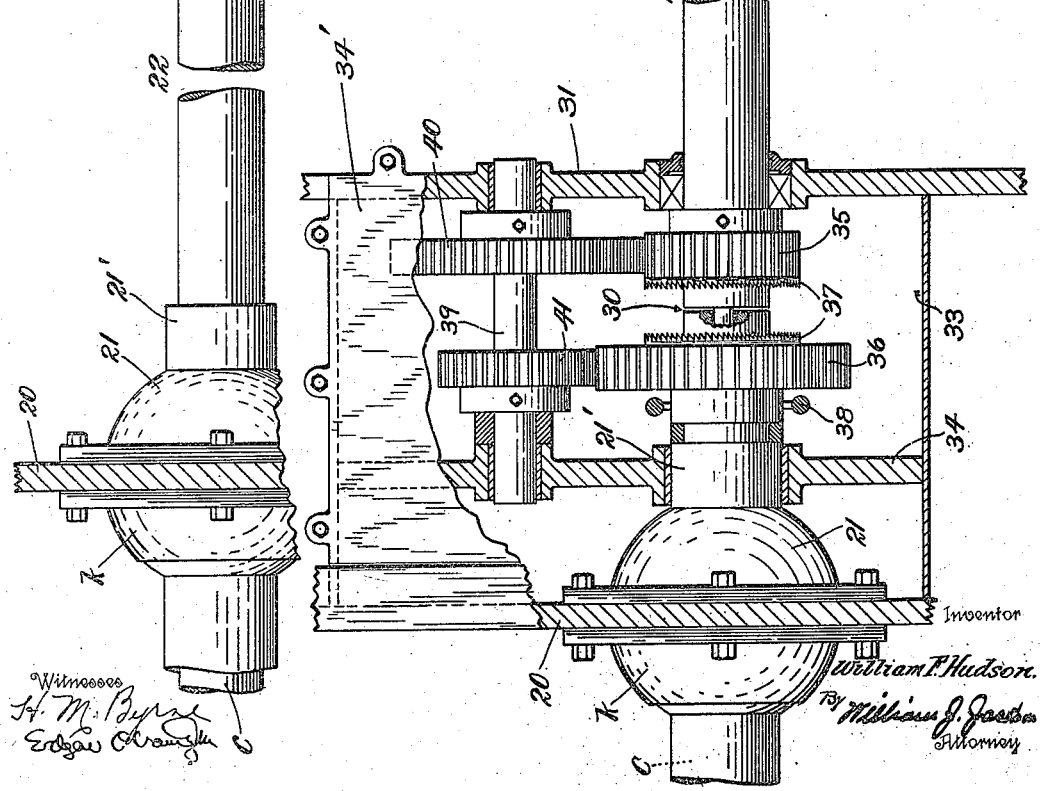

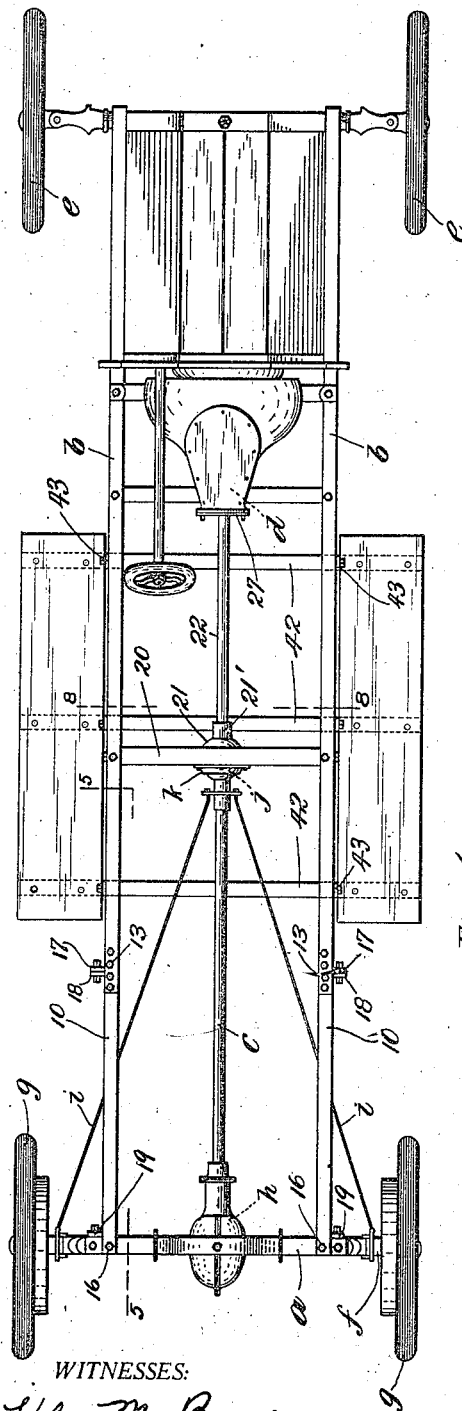
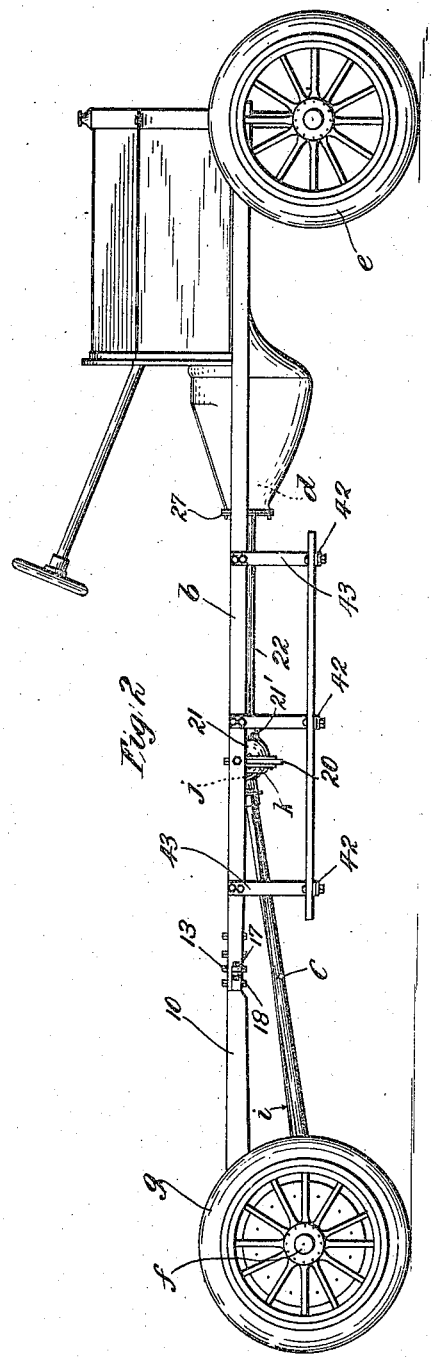

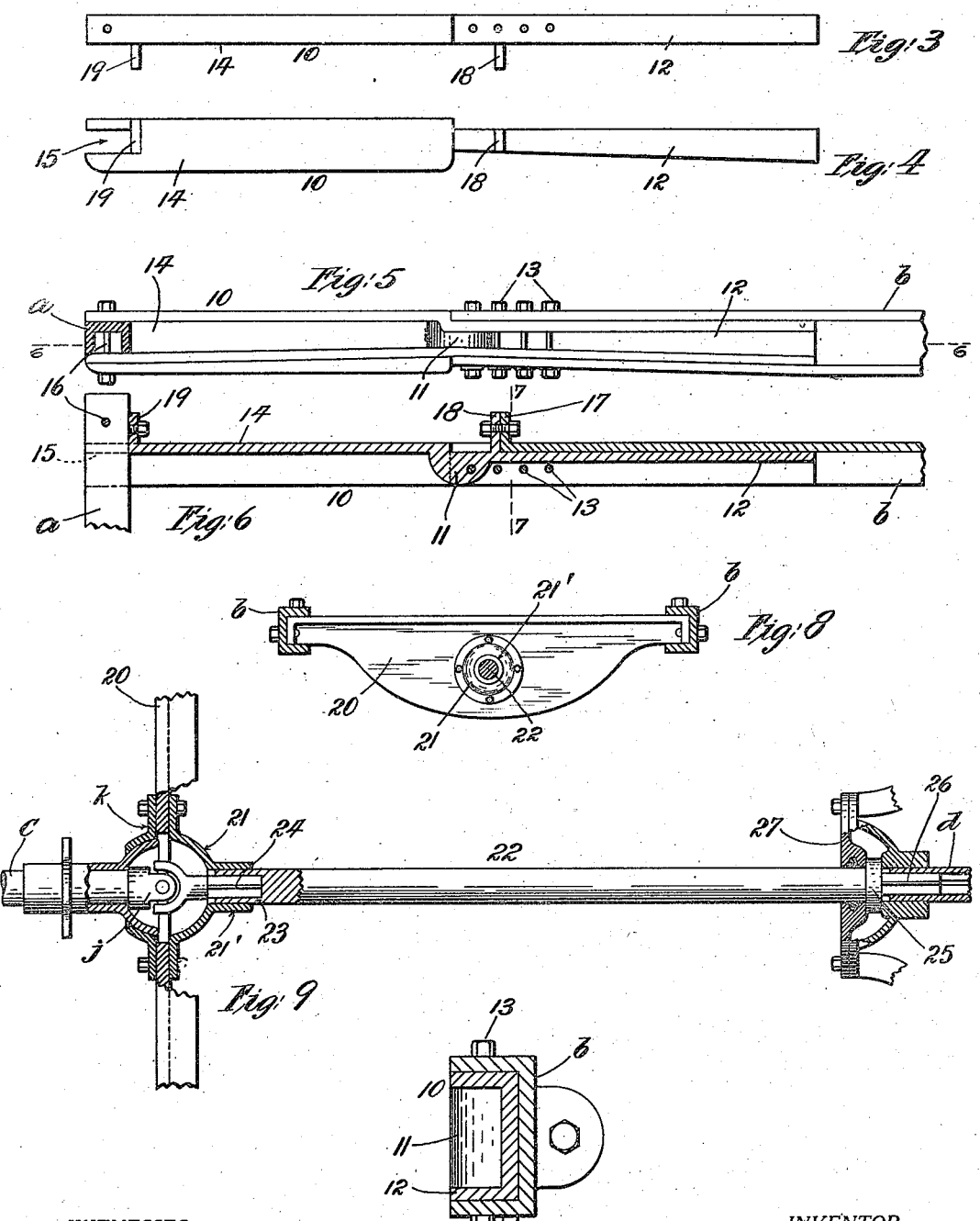

UNITED STATES PATENT OFFICE.

WILLIAM F. HUDSON, OF PHILADELPHIA, PENNSYLVANIA, ASSIGNOR TO COMMERCIAL CAR UNIT COMPANY, A CORPORATION OF PENNSYLVANIA.

MEANS FOR CONVERTING A PLEASURE-VEHICLE CHASSIS INTO A COMMERCIAL-TRUCK CHASSIS.

1,237,207.   Specification of Letters Patent.   Patented Aug. 14, 1917.

Application filed April 10, 1916. Serial No. 90,093.

*To all whom it may concern:*

Be it known that I, WILLIAM F. HUDSON, a citizen of the United States, residing at Philadelphia, in the county of Philadelphia and State of Pennsylvania, have invented a certain new and useful Means for Converting a Pleasure-Vehicle Chassis into a Commercial-Truck Chassis, of which the following is a specification.

The chassis of a motor vehicle of the pleasure type, particularly a low priced car, is of relatively light construction and has a wheel-base which is comparatively short. It has been found in practice that it is sometimes desirable to utilize the chassis of a pleasure-car for mounting thereon a truck-body; for instance, upon a chassis which has seen service, although a new chassis is frequently used. However, any load carried upon a pleasure-car chassis must necessarily be of light weight although such load may be bulky in character. As an example, a truck body to carry paper boxes must be of commodious proportions although the weight of the boxes may be readily sustained by a pleasure-car chassis. Consequently, practice has demonstrated that it is necessary to lengthen the wheel-base of the chassis in order to accommodate a proper sized body. Practice has also demonstrated that a pleasure car is so constructed that when converted into a commercial truck, the gearing thereof is not suitable for maintaining the proper speed desirable for commercial purposes. This is because a pleasure-vehicle is geared for speed rather than power, so that in the present construction, it is commercially important to control and cut down the gear ratio without, however, altering the original construction of the car differential or transmission. With the extending of the wheel-base, it has also been demonstrated that it is important to brace the chassis frame at its center, particularly adjacent that part at which is located the speed controlling mechanism above mentioned. In the present construction the braces employed not only provide rigidity to the chassis frame, but also serve as step-hanger supports and means for preventing the propeller-shaft and complemental connections from dropping to the ground in case of accidental disconnection.

The principal object of the present invention resides in the provision of means for attaining the advantages enumerated above as commercially desirable. Other and further objects of the present invention reside in the providing of general details of construction and in the providing of general arrangements, connections and combinations of parts as will hereinafter more fully appear.

With these and other objects in view, the invention consists of the improvements hereinafter described and finally claimed.

The nature, characteristic features and scope of the invention will be more fully understood from the following description taken in connection with the accompanying drawings forming part hereof and in which:

Figure 1 is a top or plan view of a motor-car chassis as converted in accordance with the present invention;

Fig. 2 is a view in side elevation thereof;

Fig. 3 is a top or plan view of a connecting bar detached;

Fig. 4 is an exterior side view thereof;

Fig. 5 is a fragmentary view taken upon the section line 5—5 of Fig. 1;

Fig. 6 is a view in section taken upon the line 6—6 of Fig. 5;

Fig. 7 is a view in section taken upon the line 7—7 of Fig. 6.

Fig. 8 is a view taken upon the line 8—8 of Fig. 1;

Fig. 9 is a sectional plan view illustrating one way of connecting the motor-transmission with the universal joint of the propeller-shaft;

Fig. 10 is a similar view of another way of connecting the motor-transmission with the propeller-shaft, and Fig. 11 is a similar view of a still different way of connecting the motor-transmission with the propeller-shaft.

For the purpose of illustrating my invention, I have shown in the accompanying drawings, forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

In practising the present invention, the rear cross-bar or end piece *a*, connecting the side pieces $b$, of a pleasure-car frame is first disconnected from said frame and the propeller-shaft $c$, is disconnected from the transmission shaft $d$ of the motor. This leaves the side piece $b$ (with the motor and transmission thereon) supported at the front by the steering wheels $e$, but unsupported at the rear. The rear construction of the pleasure-car including axle $f$, wheels $g$, differential-gearing $h$, propeller-shaft $c$, stay rods $i$, and end piece $a$ including the spring between said end piece and axle $f$, is then moved intact to the rear of said pleasure-car frame an appreciable distance and extension-pieces 10 fitted between the rear ends of the pleasure-car frame and the end piece $a$. Each extension-piece 10 comprises an elongated channeled member, the bottom of which gradually tapers from each end of the member toward the center thereof. The center portion is provided with an inwardly extended rib 11 to provide strength and rigidity. The wedge-shaped end 12 of a member 10 is forced into the rear end of a channeled side piece $b$, see Figs. 5, 6 and 7 so that the parts have nested relation and said parts are then secured together as by bolts 13. The tapered end 14 of each member 10 is slotted as at 15 for engagement with the end piece $a$, and is secured thereto as by bolts 16. The above described parts are further secured with respect to one another to provide strength and rigidity by means of abutting flanges or ears 17—18 upon the side pieces $b$ and members 10 bolted together as shown and by a flange or ear 19 upon each member 10 bolted to the end piece $a$, as shown. The frame work of the chassis is thus considerably elongated or lengthened as is the wheel-base thereof. To complete the chassis now necessitates coupling the propeller-shaft to the motor transmission $d$. For supporting the free end of the propeller-shaft or more properly speaking the universal joint $j$ carried thereby, I employ an angular cross-member 20, see Fig. 8, which is fitted to and between the side pieces $b$ and is bolted thereto. That part of the universal joint casing $k$ which originally was bolted to the transmission-housing is now bolted to the far side of the member 20 and a separate casing 21 is bolted to the near side of the member 20, see Figs. 9, 10 and 11. I now interpose between the motor-transmission and said universal-joint a stud-shaft 22 which may be in one or more sections as shown in said last mentioned figures.

A description will be first given of the construction of stud-shaft shown in Figs. 1, 2 and 9. This shaft is constructed in one piece and as clearly shown in Fig. 9 one end thereof is provided with a squared opening 23 to receive the squared projection 24 of the universal-joint which originally engaged the motor-transmission and the opposite end of the stud-shaft is provided with a collar 25 and a squared projection 26. The squared projection engages with the motor-transmission shaft $d$ as shown and the collar abuts against the transmission-casing, a retaining plate 27 bolted to the transmission-casing coöperating with the collar 25 to prevent endwise movement of the stud-shaft. The retaining plate 27 is fully described and claimed in my application for Letters Patent Serial No. 72,308, so that further description thereof is unnecessary. The casing 21 is provided with a sleeve 21' forming a bearing for the end of stud-shaft 22 which has the squared opening therein. The stud-shaft is horizontally disposed and the propeller-shaft is disposed at an angle as usual, and which is made possible by means of the flexible connection provided by said universal joint.

The above construction is of simple form, is inexpensive and when assembled by skilled labor is reliable. Frequently, however, persons unskilled in mechanics, convert their pleasure-cars into commercial conveyances, the various parts being shipped to them, and if the stud-shaft and propeller-shaft are not properly alined with the transmission-shaft, a satisfactory job is not had. To take care of such cases, I have designed the construction of stud-shaft disclosed in Fig. 10 of the drawings. This stud-shaft has flexible connection with the propeller shaft as above described and in addition has flexible connection as at 30 with a short stud-shaft 22' which latter is fitted to the motor-transmission as clearly illustrated, a retaining plate similar to the one previously referred to being present to prevent endwise movement of the short stud. This stud-shaft and its mode of connection is fully described and claimed in my aforesaid application for Letters Patent. By reason of the two flexible joints, a novice can assemble the parts to attain reliable operation thereof.

Referring now to Fig. 11, there is disclosed mechanism for cutting down the gear ratio of the pleasure-car differential without, however, changing the construction of the said differential. This mechanism may be employed upon either of the stud shafts above described although, it has been illustrated in application to the last above described stud-shaft. Primarily, the stud-shaft 22 is in two parts, divided as at 30, of which one end has a pin and the other end an aperture to receive the pin to maintain the two sections in alinement. Paralleling the cross-member 20 is a cross-member 31 adapted to be supported between the side pieces $b$—$b$ of the chassis, which cross-member is provided with a bearing of suitable type within which is supported one free end of stud 22. Supported by and between the said cross-members is a gear-casing or housing 33 equipped with a removable top or cover 34' so that access may be readily had to the gearing about to be described. Fixed to said gear-casing is a short cross-member 34 which supports the other free end of stud 22, the sleeve 21' of dust cap 21 being the part actually supported. Fixed to one section of the two part stud is a gear-wheel 35 and shiftable upon the other section thereof is a gear-wheel 36, the opposed faces of which gear-wheels are each furnished with crown-gears 37 so that when one gear is shifted toward the other, the crown-gears may mesh in order that the two sections of the stud 22 may rotate in unison. Unless so coupled together, the two sections have independent speeds through the intervention of gearing to be now described. The gear-wheel 36 may have connection as at 38 with any well known arrangement of levers (not shown) operable from the driver's seat. Paralleling the stud-shaft within the casing 33 is a shaft 39 mounted in cross-members 31 and 34. Fixed thereon are gear-wheels 40 and 41 of which gear-wheel 40 meshes with gear-wheel 35 at all times and gear-wheel 41 is in mesh with the shiftable gear-wheel 36 when the stud-shaft sections are rotatively disconnected as shown in the drawings. When gear-wheel 36 is shifted to have its crown-gear mesh with the similar portion of gear-wheel 35, said gear-wheel 41 runs free. Thus instead of being forced to speed the propeller-shaft c as is customary in a pleasure-car, the operator of a loaded commercial conveyance as converted by the above recited construction may shift gear-wheel 36 to the position shown and cut down the gear ratio of the pleasure-car differential h to a speed consistent with commercial demands. Obviously if the truck be empty, full speed may be had by shifting gear-wheel 36 so that the two sections of stud-shaft 22 rotate in unison.

Practice has demonstrated, when a pleasure-car frame is extended or lengthened, that struts or cross-bars are necessary to add strength and rigidity to the extended frame. These are best placed substantially midway of the length of the chassis as shown in Figs. 1 and 2 and which struts are designated 42. These struts are connected with the step-hangers 43 and serve to tie the free ends thereof together more or less rigidly so that when the steps are used, little or no vibration or shock is referred to side pieces b—b of the frame. Shocks and vibrations tend to distort the frame contour and thus strain the propeller and stud-shaft relations. These struts further serve to prevent the propeller shaft and stud from falling to the ground should connection therebetween be accidentally broken during operation of the parts. The disadvantage of having such parts fall to the ground during operation, with consequent damage will be readily apparent. Thus rearranged or converted, the original pleasure-car provides at small expense and little labor, a commercial truck chassis for light work. For instance, it is particularly adapted for use by undertakers, florists, paper-box manufacturers and the like.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the fair spirit or scope of the invention or sacrificing any of its advantages.

What I claim is:

1. In a motor-car construction, a pleasure-car chassis the side pieces of the frame of which have been lengthened to correspondingly extend the wheel-base and original frame for commercial purposes, propulsion means operatively interposed between the motor-transmission and rear axle differential, step-hanger sets secured to the frame as extended and laterally disposed struts rigidly connected between said step-hanger sets and beneath the said propulsion means.

2. In a motor-car construction, the combination of a pleasure-car chassis, including motor-transmission and propeller-shafts, the side pieces of the frame of which chassis have been lengthened to correspondingly extend the wheel-base and frame for commercial purposes, with an extension-shaft operatively interposed between said motor-transmission and propeller-shafts which extension-shaft is two-part so as to run at selected speeds, a gear-wheel fixed to one shaft part and a gear-wheel shiftably mounted upon the remaining shaft part, which gear-wheels are designed to cooperatively engage one another clutch fashion in one position of the shiftable gear-wheel, for turning in unison the extension-shaft parts and a shaft paralleling the extension-shaft having mounted thereon gear-wheels, one of which is constantly in mesh with the non-shiftable gear-wheel and the other of which is in mesh with shiftable gear-wheel in its normal or non-clutch position only.

3. In a motor-car construction, the combination of a pleasure-car chassis, including motor-transmission and propeller-shafts, the side pieces of the frame of which chassis have been lengthened to correspondingly extend the wheel-base and frame for commercial purposes, with an extension-shaft operatively interposed between the motor-transmission and propeller-shafts which extension-shaft is two part so as to revolve in unison or at different speeds, a gear-casing secured between said side pieces forming a bearing for the opposed ends of said extension-shaft, a shaft paralleling the extension-shaft rotatable in said casing, a gear-wheel having a claw clutch fixed to one end of said extension-shaft, a similar gear-wheel shiftable upon the opposed end of said shaft, means for shifting the latter gear-wheel into clutch fashion engagement with the fixed gear-wheel and other gear-wheels mounted upon the shaft within the casing of which one of said gear-wheels is constantly in mesh with the non-shiftable gear-wheel and of which the other is in mesh with the shiftable gear-wheel in its normal or non-clutch position only.

4. In an automobile construction, channeled side pieces, an end piece, channeled extensions fitted between said end piece and the side pieces, said extension each embracing an elongated member having a forked end to engage over the end piece and having a contracted inner end for nesting within a side piece and means for securing said parts together.

5. In an automobile construction, channeled side pieces, an end piece, channeled extensions fitted between said end piece and the side pieces, said extensions each embracing an elongated member, the central portion of which is provided with a strengthening rib, the outer end being forked for engaging over the end piece and the inner end being contracted for nesting within a side piece and means for securing said parts together.

In testimony whereof, I have hereunto signed my name.

WILLIAM F. HUDSON.

Witnesses:
WILLIAM J. JACKSON,
HELEN M. BYRNE.

Copies of this patent may be obtained for five cents each, by addressing the "Commissioner of Patents, Washington, D. C."